(12) United States Patent
Kakouros et al.

(10) Patent No.: US 7,249,068 B1
(45) Date of Patent: *Jul. 24, 2007

(54) SPOT MARKET-BASED INVENTORY PLANNING

(75) Inventors: Steve Kakouros, Palo Alto, CA (US); John J. Neale, Palo Alto, CA (US); Gianpaolo Callioni, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1149 days.

This patent is subject to a terminal disclaimer.

(21) Appl. No.: 09/608,057

(22) Filed: Jun. 30, 2000

(51) Int. Cl.
G06G 1/00 (2006.01)

(52) U.S. Cl. .......................... 705/28; 705/26

(58) Field of Classification Search .................. 705/28, 705/26
See application file for complete search history.

(56) References Cited

U.S. PATENT DOCUMENTS

| | | |
|---|---|---|
| 4,744,027 A | 5/1988 | Bayer et al. |
| 5,003,473 A | 3/1991 | Richards |
| 5,168,446 A | 12/1992 | Wiseman |
| 5,287,267 A | 2/1994 | Jayaraman et al. |
| 5,596,493 A | 1/1997 | Tone et al. |
| 5,715,402 A | 2/1998 | Popolo |
| 5,819,232 A | 10/1998 | Shipman |
| 5,946,662 A | 8/1999 | Ettl et al. |
| 5,963,919 A * | 10/1999 | Brinkley et al. ............... 705/28 |
| 5,963,923 A | 10/1999 | Garber |
| 6,006,196 A | 12/1999 | Feigin et al. |
| 6,144,945 A * | 11/2000 | Garg et al. .................... 705/28 |
| 6,341,271 B1 * | 1/2002 | Salvo et al. ................... 705/28 |
| 6,415,266 B1 * | 7/2002 | Do ............................... 705/28 |

FOREIGN PATENT DOCUMENTS

EP 893775 * 1/1999

OTHER PUBLICATIONS

Choudhury et al., "Uses and consequences of electronic markets: An empirical investigation in aircraft parts industry", MIS Quarterly, v22n4, pp. 471-507.*

* cited by examiner

*Primary Examiner*—Michael Cuff

(57) ABSTRACT

An inventory planning scheme is described in which an optimal safety stock level of a product is estimated to cover uncertainty in demand over an exposure period with a desired service level based at least in part upon product availability from a spot market. The inventory planning scheme enables an asset manager to cover uncertainty in future end customer demand with a safety stock level that is less than the safety stock level required to cover expected demand with a desired service level when supply is available only from non-spot market sources. In this way, an asset manager may trade some certainty in product price for a shorter and more certain product delivery time to reduce overall product costs by reducing the level of safety stock kept on hand. In particular, per unit prices of products supplied by spot market sources may be higher than the prices of comparable products and components supplied by non-spot market sources. However, depending upon market conditions, overall product costs may be lowered by reducing safety stock levels (and, consequently, lowering total safety stock costs), and supplying from spot market sources the fraction of unmet actual demand needed to reach target service levels.

18 Claims, 9 Drawing Sheets

SPOT MARKET-BASED INVENTORY PLANNING

CROSS-REFERENCE TO RELATED APPLICATIONS

This application is related to U.S. application Ser. No. 09/608,092, filed on even date herewith, by Steve Kakouros et al., and entitled "Spot Market-Based Inventory Planning Tools," and to U.S. application Ser. No. 09/608,056, filed on even date herewith, by Steve Kakouros et al., and entitled "Spot Market-Based Inventory Planning Services," both of which are incorporated herein by reference.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

This invention relates to systems and methods for planning inventories when supply is available from a spot market.

BACKGROUND

Asset managers of large manufacturing enterprises, for example, computer manufacturers, electronics manufacturers and auto manufacturers, must determine the inventory levels of components and finished products that are needed to meet specified end customer service levels (i.e., the fraction of customer orders that should be received by the requested delivery dates). For such manufacturing enterprises, the delivery of a finished product to an end customer typically involves a complex network of suppliers, fabrication sites, assembly locations, distribution centers and customer locations through which components and products flow. This network may be modeled as a supply chain that includes all significant entities participating in the transformation of raw materials or basic components into the finished products, which ultimately are delivered to the end customer.

Each of the steps in a supply chain involves some uncertainty. For example, for a variety of reasons (e.g., changes in product life cycles, seasonal variations in demand, and changing economic conditions), future end customer demand is uncertain. In addition, the times at which ordered raw materials and components will be received from suppliers is uncertain. To handle such uncertainty, many different statistical models have been proposed to determine the appropriate inventory levels (i.e., safety stock) to hold at each level of a supply chain to meet target service level requirements. Conventionally, safety stock levels may be estimated based upon the average lead time, the variance in the lead time, the average demand rate, and the variance in the demand rate (see, e.g., EDWARD A. SILVER & REIN PETERSON, DECISION SYSTEMS FOR INVENTORY MANAGEMENT AND PRODUCTION PLANNING (1985)). Various elaborations on this conventional inventory planning model have been proposed. For example, U.S. Pat. No. 5,946,662 describes a method of optimizing inventories that enables asset managers to assess the tradeoff between service levels and the investment in inventories needed to support those service levels. U.S. Pat. No. 5,819,232 describes an inventory planning method that incorporates customer order lead time information into the inventory level determination process. Still other inventory planning strategies have been proposed.

SUMMARY

Prior inventory planning schemes have focused on traditional supplier markets, which are characterized by relatively certain information about future prices but relatively uncertain information about future delivery times. The invention provides additional flexibility by accommodating supply availability from spot markets, which are characterized by relatively uncertain price information but relatively certain delivery information. By incorporating spot market supply information into an inventory planning model, the invention enables asset managers to take advantage of spot market supplies to reduce inventory levels and lower overall product supply costs relative to business models that rely solely on non-spot market supplies.

In one aspect, the invention features an inventory planning scheme in which a safety stock level is planned to cover uncertainty in demand over an exposure period with a desired service level based at least in part upon product availability from a spot market.

Embodiments of the invention may include one or more of the following features.

A maximum safety stock level of the product to cover uncertainty in demand over the exposure period with the desired service level may be estimated based upon product availability from a non-spot market supply. An optimal safety stock level may be estimated by reducing the maximum safety stock level based upon product availability from a spot market supply.

The maximum safety stock level estimation preferably is based in part upon one or more of the following parameters: an estimation of lead time and lead time uncertainty for obtaining the product from the non-spot market supply; an estimation of product demand and demand uncertainty for the product; and the review period between replenishment decisions.

The optimal safety stock level estimation may be based in part upon a cost of obtaining the product from the spot market.

The maximum safety stock level may be reduced based upon an estimation of a total cost of covering the maximum safety stock level with a combination of product received from the spot market and product received from the non-spot market supply. The total cost may be estimated based in part upon an estimation of the expected amount of spot market product needed to cover uncertainty in demand over the exposure period with the desired service level for a given amount of non-spot market product. The total cost also may be estimated based in part upon a cost of obtaining the product from the spot market and a cost of obtaining the product from the non-spot market supply.

The optimal safety stock level preferably is estimated by minimizing the estimated total cost. The optimal safety stock level preferably corresponds to a safety stock level that minimizes the estimated total cost. The optimal safety stock level may be estimated based at least in part upon a stochastic simulation of one or more random variables.

The optimal safety stock level preferably is ordered from the non-spot market supply. A product level needed to meet actual demand above the optimal safety stock level and within the desired service level preferably is ordered from the spot market supply.

Product may be ordered from the spot market by navigating a web site. In addition, the safety stock level may be planned by navigating a web site providing information relating to use of the spot market to plan an inventory level. The safety stock level may be planned by providing information to an inventory planning engine that is accessible through the web site, including information relating to product demand and information relating to non-spot market lead time.

Enterprise resource planning also may be performed based upon the planned safety stock level.

Among the advantages of the invention are the following.

The invention provides an inventory planning scheme that enables an asset manager to cover uncertainty in future end customer demand with a safety stock level that is less than the safety stock level required to cover expected demand with a desired service level when supply is available only from non-spot market sources. In this way, an asset manager may trade some certainty in product price for a greater certainty in product delivery times to reduce overall product costs by reducing the level of safety stock kept on hand. In particular, per unit prices of products supplied by spot market sources may be higher than the prices of comparable products and components supplied by non-spot market sources. However, depending upon market conditions, overall supply chain costs may be lowered by reducing safety stock levels (and, consequently, lowering total safety stock costs), and supplying from spot market sources the fraction of unmet actual demand needed to reach target service levels.

Other features and advantages of the invention will become apparent from the following description, including the drawings and the claims.

DETAILED DESCRIPTION

I. Distribution System with a Spot Market Supply

Figure 1:
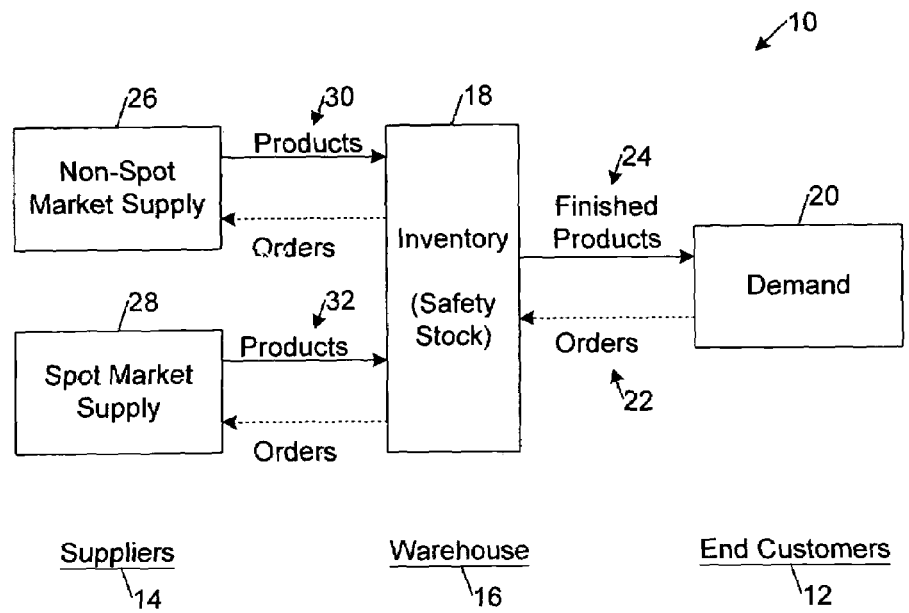
FIG. 1 is a block diagram of a distribution network that includes a non-spot market supply of products and a spot market supply of products.

Referring to FIG. 1, in one embodiment, a simplified distribution system 10 includes a network of end customers 12, suppliers 14, and a warehouse 16 that contains a product inventory 18. End customers 12 may include purchasers of branded retail products, purchasers of second label retail products, and direct sales purchasers. In operation, end customer demand 20 drives orders 22, which are satisfied by shipments of products 24 from inventory 18. Product inventory 18 is replenished by two supply markets: a non-spot market supply 26, and a spot market supply 28. Non-spot market supply 26 may include traditional suppliers (e.g., retailers and manufacturers of components and finished products) that deliver products 30 to warehouse 16 on the basis of structured negotiated contracts or dynamic contracts, both of which typically specify a particular product price and a requested delivery lead time (i.e., the time by which a product order should be satisfied). Spot market supply 28, on the other hand, delivers products 32 with essentially no lead time at a price set by the spot market, a price which typically is greater than the price at which comparable products 30 may be obtained from non-spot market 26. Spot market supply 28 may be accessible through an Internet web site or other communication system configured to implement an auction that enables product suppliers to attract numerous buyers who, as a group, will determine the final product price. Typically, such a spot market is structured to enable a seller to select the product to be sold and the time at which the product will be offered for sale. In some auction models, a seller may be permitted to specify a minimum price below which the product may not be sold; alternatively, a seller may be permitted to reject the established market price, unless the item is being sold without reserve.

Figure 2:
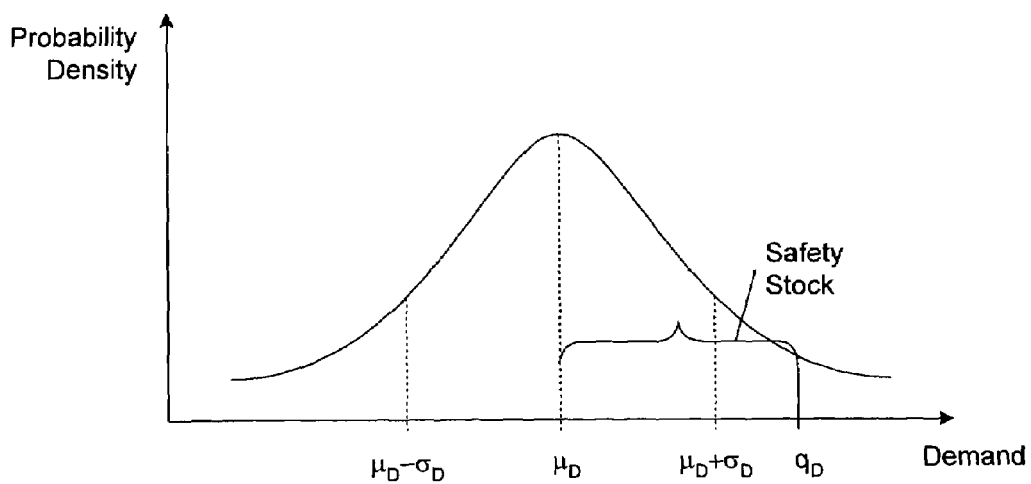
FIG. 2 is a probability density plot of end customer exposure period demand for a product.
Figure 3A:
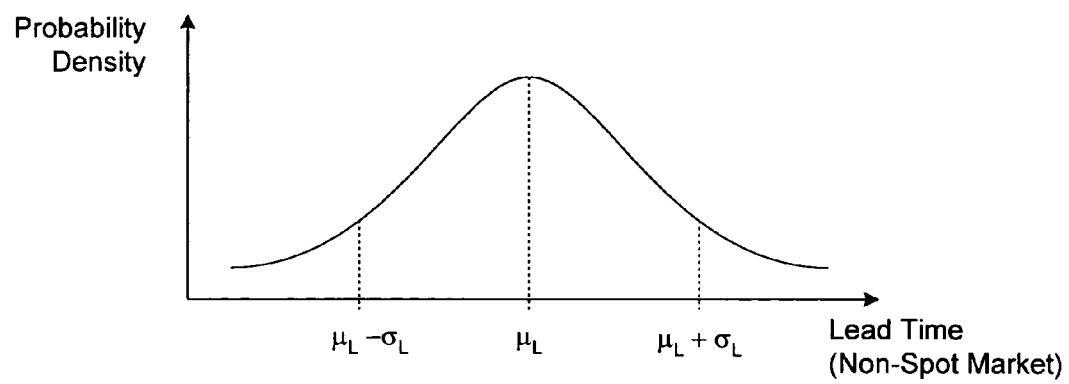
FIGS. 3A and 3B are respective probability density plots of delivery lead time and product price for a non-spot market supply.
Figure 3B:
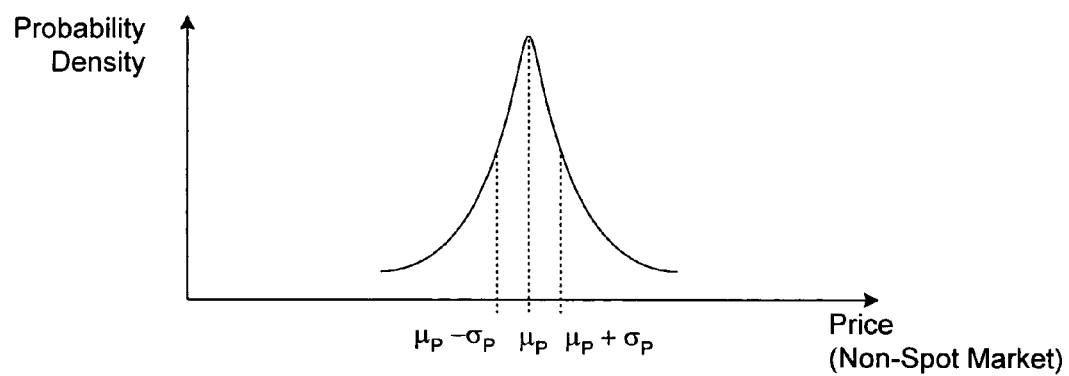

Referring to FIG. 2, future end customer demand 20—which drives the flow of products through distribution system 10—typically is uncertain and may be modeled probabilistically as a probability density function plotted as a function of exposure period demand. Various demand forecasting techniques may be used to project future demand 20 by end customers 12 for products 24. For example, future demand may be estimated based on a variety of information, such as experience, customer information and general economic conditions. Alternatively, demand may be forecasted based upon an analysis of historical shipment data using known statistical techniques. No matter how demand is forecasted, however, the resulting demand forecast typically is characterized by a high level of uncertainty. Typically, future end customer demand 20 is estimated by a probability density function with a normal distribution characterized by an estimate of mean demand ($\mu_D$) and an estimate of demand uncertainty (e.g., a standard deviation of $\sigma_D$).

As mentioned above, to protect against uncertainty in future end customer demand, asset managers must keep a certain minimum inventory level (i.e., safety stock) on hand. In particular, the safety stock level is the amount of product that should be held in stock to cover the variability in demand over the uncertain exposure period in order to meet a target customer service level. The more safety stock that is maintained in warehouse 16, the greater demand variability that may be covered. Of course, if too much safety stock is kept on hand, any unused safety stock will increase product costs and decrease the profitability of the enterprise. As used herein, the service level achieved in a particular period is defined as the probability that the product demand in that period plus the unsatisfied product demand in previous periods is met.

When products and components are available solely from non-spot market sources, the level of safety stock may be estimated by the product of a safety stock factor (representing a specified service level) and the standard deviation of demand over the exposure period. As explained in detail below, however, it has been realized that the safety stock level (and, consequently, the overall product cost) may be reduced by taking advantage of supply availability from a spot market. In particular, although per unit prices of products supplied by spot market sources may be higher than the prices of comparable products and components supplied by non-spot market sources, overall product costs may be lowered by reducing safety stock levels and supplying from spot market sources the fraction of unmet actual demand needed to reach target service levels.

Figure 4A:
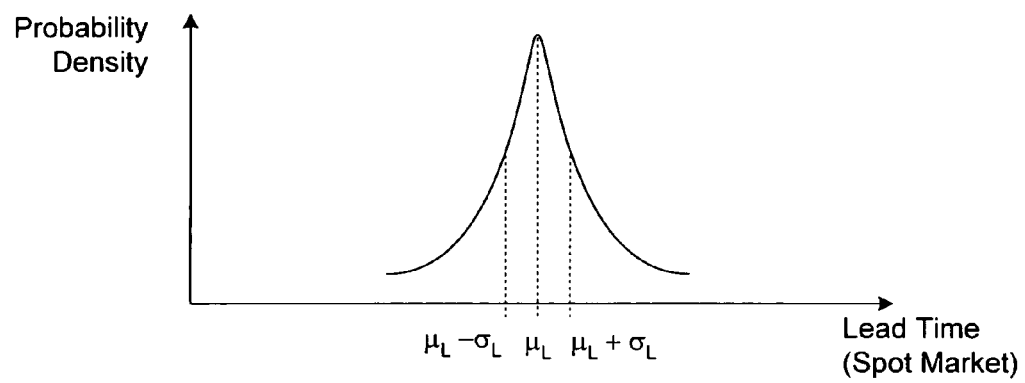
FIGS. 4A and 4B are respective probability density plots of delivery lead time and product price for a spot market supply.
Figure 4B:
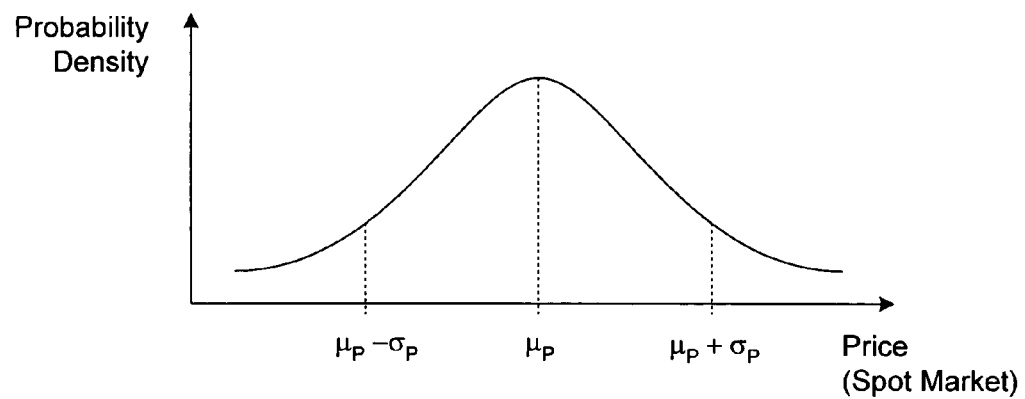

As a general rule of thumb, additional safety stock should be carried when supply lead time and supply lead time variability is high. As shown in FIGS. 3A, 3B, 4A and 4B, product supplies from non-spot market sources are characterized by relatively uncertain lead times (FIG. 3A) and relatively certain prices (FIG. 3B), whereas product supplies from spot markets sources are characterized by relatively certain lead times (FIG. 4A) and relatively uncertain prices (FIG. 4B). Thus, additional safety stock generally is needed for products supplied by non-spot market sources to cover non-spot market lead time and to protect against significant non-spot market lead time variability. On the other hand, additional safety stock generally is not needed for products supplied by spot market sources. Although spot market prices may fluctuate with changing market conditions, an asset manager is assured of obtaining from the spot market products needed to cover unmet actual demand at some (although uncertain and potentially high) price. This feature of spot market sources enables asset managers to reduce safety stock levels below the levels needed to cover service level requirements.

II. Spot Market-Based Inventory Planning Tools

Figure 5:
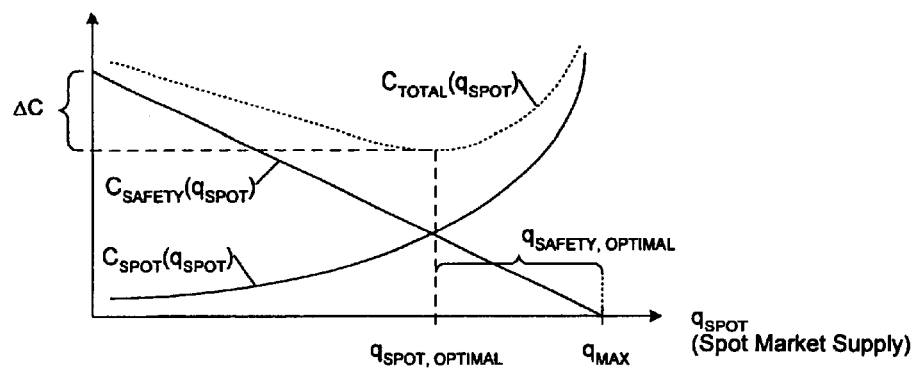
FIG. 5 is a graph of product cost plotted as a function of the quantity of product received from a spot market supply in a graphical representation of an inventory planning process.

As shown in FIG. 5, in one inventory planning process, it is assumed that the total amount of safety stock needed to cover the variability in end customer demand over the exposure period with a specified service level is represented by $q_{MAX}$. This level of safety stock may be met by a combination of a reduced safety stock level ($q_{SAFETY}$) that is kept on hand and supplied by non-spot market sources, and products supplied in real time by spot market sources ($q_{SPOT}$) to meet actual unmet demand that falls within target service level requirements ($q_{MAX}=q_{SAFETY}+q_{SPOT}$). The total non-spot market product cost ($C_{SAFETY}(q_{SPOT})$) decreases linearly with the amount of product supplied by spot market sources ($q_{SPOT}$). At the same time, the total spot market product cost ($C_{SPOT}(q_{SPOT})$) increases with the amount of product supplied by spot market sources ($q_{SPOT}$). In this model, the total spot market product cost is assumed to increase nonlinearly as a function of spot market quantity; however, in other models, the total spot market cost may increase linearly with spot market quantity or may vary with spot market quantity in ways selected to reflect actual conditions of the customer demand and the spot market. As shown, the total product cost ($C_{TOTAL}(q_{SPOT})=C_{SAFETY}(q_{SPOT})+C_{SPOT}(q_{SPOT})$) has a characteristic U shape, and is minimized when the maximum safety stock level ($q_{MAX}$) is reduced by the optimal quantity ($q_{SPOT, OPTIMAL}$) of product to be supplied by spot market sources. Depending upon actual demand and market conditions, the overall reduction in total product cost ($\Delta C$) may be quite substantial.

Figure 6:
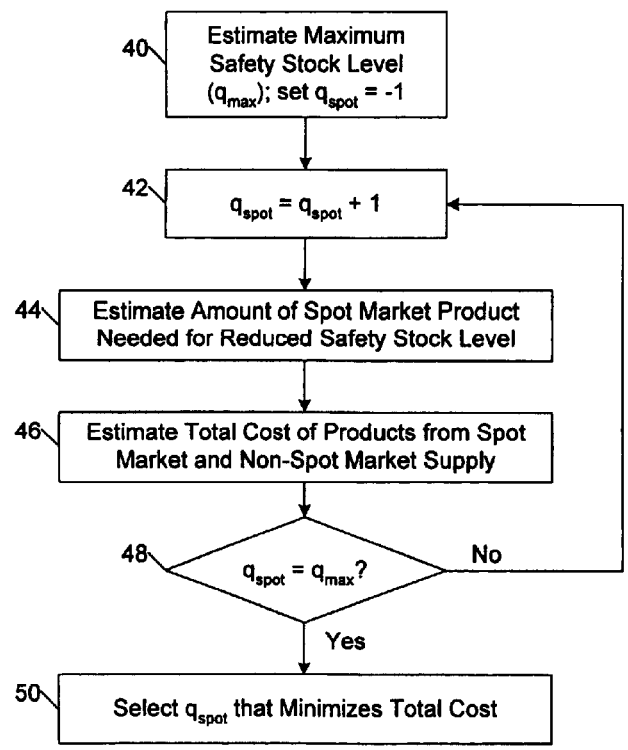
FIG. 6 is a flow diagram of an inventory planning cost minimization process.

Referring to FIG. 6, in one inventory planning process, the optimal safety stock level ($q_{SAFETY, OPTIMAL}$) that minimizes the total product cost may be estimated as follows. Initially, the maximum safety stock level ($q_{MAX}$) is estimated (step 40). The maximum safety stock level may be estimated by conventional inventory planning techniques that assume supply availability solely from non-spot market sources. For example, the maximum safety stock level may be estimated by the product of a safety stock factor and the standard deviation of demand over the exposure period. In one embodiment, the maximum safety stock level ($q_{MAX}$) is estimated by the following equation:

$$q_{MAX}=\Phi^{-1}(\alpha)\times[\mu_D^2 \cdot \sigma_L^2+(\mu_L+R)\cdot\sigma_D^2]^{1/2} \quad (1)$$

Where $\Phi^{-1}(z)$ is the standard normal inverse function, $\alpha$ is the service level specified as the probability of meeting all demand in the review period, $\mu_D$ is the estimated mean demand, $\sigma_L$ is the estimated lead time standard deviation, $\mu_L$ is the estimated mean lead time, $\sigma_D$ is the estimated demand standard deviation, and R is the review period. In equation (1), the factor ($\mu_L+R$) corresponds to the exposure period. Other embodiments may estimate the maximum safety stock level in different ways.

The safety stock level is reduced from the estimated maximum safety stock level ($q_{MAX}$) by an incremental amount (e.g., a unit amount) (step 42). The expected amount of safety stock that would have to be supplied from spot market sources to meet expected unmet demand above the reduced safety stock level ($q_{SAFETY}$) and within the target service level is estimated (step 44). For a given reduced safety stock level ($q_{SAFETY}$) the expected quantity actually needed from the spot market ($q_{SPOT, ACTUAL}$) to cover target service level requirements over the exposure period may be estimated by the following equation:

$$q_{SPOT, ACTUAL}=\Sigma_i P(i-1<\text{Demand}\leq i)\cdot(i-(\mu_{EXP}+q_{SAFETY}))$$

$$\text{for } i=\mu_{EXP}+q_{SAFETY}+1 \text{ to } \mu_{EXP}+q_{MAX} \quad (2)$$

Where P(x) is the probability density function of demand over the exposure period with a mean of $\mu_{EXP}$ and a standard deviation of $\sigma_{EXP}$. These parameters may be estimated as follows:

$$\mu_{EXP}=\mu_D\cdot(\mu_L+R) \quad (3)$$

$$\sigma_{EXP}=[\mu_D^2\cdot\sigma_L^2+(\mu_L+R)\cdot\sigma_D^2]^{1/2} \quad (4)$$

Next, the total expected product costs of the estimated safety stock level ($C_{SAFETY}(q_{SPOT})$) and the estimated spot market level ($C_{SPOT}(q_{SPOT})$) are estimated from the reduced safety stock level ($q_{SAFETY}=q_{MAX}-q_{SPOT}$) and the actual spot market level ($q_{SPOT, ACTUAL}$) as follows (step 46):

$$C_{SAFETY}(q_{SPOT})=\rho_{SAFETY}\cdot I_{SAFETY}\cdot(q_{MAX}-q_{SPOT}) \quad (5)$$

$$C_{SPOT}(q_{SPOT})=(\rho_{SPOT}-\rho_{SAFETY})\cdot q_{SPOT, ACTUAL}\cdot(\text{\# review periods per year}) \quad (6)$$

Where $\rho_{SAFETY}$ and $\rho_{SPOT}$ are the per-unit costs for products supplied from non-spot market sources and spot market sources, respectively, and $I_{SAFETY}$ is the annual inventory-driven cost percentage. The per unit spot market cost ($\rho_{SPOT}$) may incorporate spot market fees and other costs associated with obtaining products from spot market sources.

The total expected product cost ($C_{TOTAL}(q_{SPOT}) = C_{SAFETY}(q_{SPOT}) + C_{SPOT}(q_{SPOT})$) is calculated for each possible value of $q_{SPOT}$ (from 0 to $q_{MAX}$) (step 48). The optimal safety stock level ($q_{SAFETY, OPTIMAL}$) is then determined from the value of $q_{SPOT}$ that results in the minimum total expected product cost ($C_{TOTAL}(q_{SPOT, OPTIMAL})$) and $q_{SAFETY, OPTIMAL} = q_{MAX} - q_{SPOT, OPTIMAL}$ (step 50). Note that certain simplifying assumptions may be made so that $q_{SPOT, OPTIMAL}$ may be computed directly from a closed form equation, in which case the iterative loop in the process of FIG. 6 may be avoided.

Figure 7:
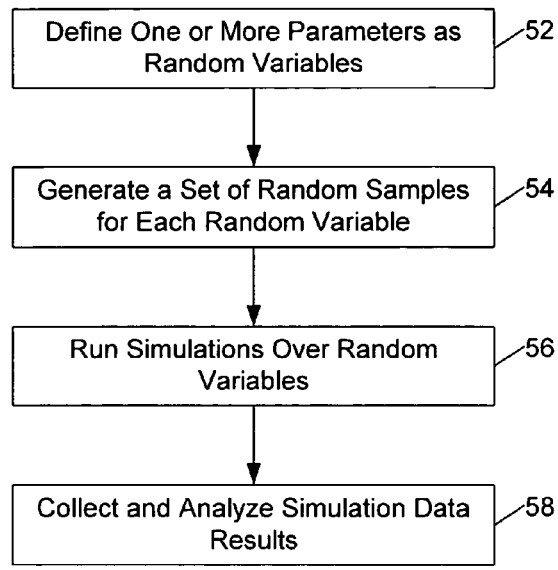
FIG. 7 is a flow diagram of a basic inventory planning simulation process.

Referring to FIG. 7, the above-described inventory planning process may be extended by treating one or more input parameters (e.g., demand, lead time, spot market cost or non-spot market cost) stochastically. In accordance with another inventory planning embodiment, one or more input parameters are defined as random variables (step 52). A set of random samples for each random variable is generated (step 54). The sets of random samples may be generated based upon a selected probability distribution that matches an estimate of the mean and standard deviation for the random variable. Random samples are generated from the selected probability distribution using any one or several conventional techniques (e.g., the inverse transform method). Simulations (e.g., Monte Carlo simulations) are then run over the random variables (step 56). For information relating to Monte Carlo simulation techniques see, for example, PAUL BRATLEY ET AL., A GUIDE TO SIMULATION (1987) and JERRY BANKS ET AL., DISCRETE-EVENT SYSTEM SIMULATION (1996). The resulting data produced from the simulations is collected and analyzed statistically (step 58). This inventory planning process embodiment enables asset managers to make statistically significant decisions relating to one or more of the input parameters and, therefore, make better use of spot markets.

Figure 8:
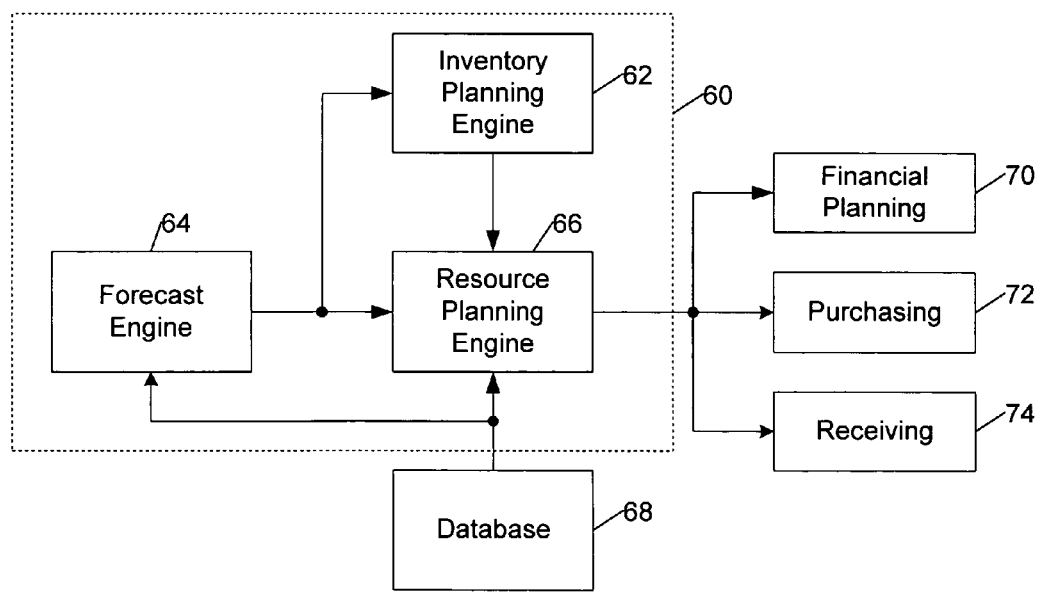
FIG. 8 is a block diagram of an enterprise resource planning system.

As shown in FIG. 8, in another embodiment, the above-described inventory planning processes may be incorporated into an enterprise resource planning system 60 that is configured to estimate future on-hand inventory requirements and future replenishment requirements. Enterprise resource planning system 60 includes an inventory planning engine 62, a forecast engine 64, an enterprise resource planning engine 66, and a database 68. Inventory planning engine 62 is configured to implement the inventory process of FIG. 6 based upon parameters supplied by a user or by forecast engine 64, or both. Forecast engine 64 is configured to analyze historical shipment data contained in database 68 and to compute an estimate of mean future demand 20 by end customers 12 for products 24, as well as compute an estimate of future demand variability. Forecast engine 64 also may be configured to compute an estimate of mean lead time for ordered products 30 to be received at warehouse 16, as well as compute an estimate of lead time variability. Enterprise resource planning engine 66 is configured to receive inventory planning information from inventory planning engine 62 and forecast information from forecast engine 64, and from this information to estimate inventory levels at various distribution points in the supply chain using standard enterprise resource planning techniques. In particular, enterprise resource planning engine 66 may be operable to recursively compute replenishment requirements for a specific product at each distribution point. The distribution points may include warehouses, terminals or consignment stock at a distributor or a customer. Enterprise resource planning engine 66 may be configured to compute and set re-stock trigger points so that product may be shipped in time from the manufacturing facility to the distribution points. In one embodiment, enterprise resource planning engine 66 estimates distribution point inventory levels based upon information relating to the lead time needed to manufacture and transport product from the manufacturing facility to the distribution point. Information generated by enterprise resource planning system 60 may be transmitted to a financial planning unit 70, a purchasing unit 72 and a receiving unit 74 to carry out the resource planning recommendations of the system.

III. Spot Market-Based Inventory Planning

An asset manager may utilize the above-described inventory planning process to cover uncertainty in future end customer demand with a safety stock level that is less than the safety stock level required to cover expected demand with a desired service level when supply is available only from non-spot market sources. In this way, an asset manager may trade some certainty in product price for shorter and more certain product delivery times to reduce overall product costs by reducing the level of safety stock kept on hand. After the optimal (reduced) safety stock level ($q_{SAFETY, OPTIMAL}$) has been ordered and is on hand, the enterprise will meet demand from inventory until the safety stock level has been depleted, at which point the enterprise will meet demand with supplies purchased on the spot market.

Figure 9:
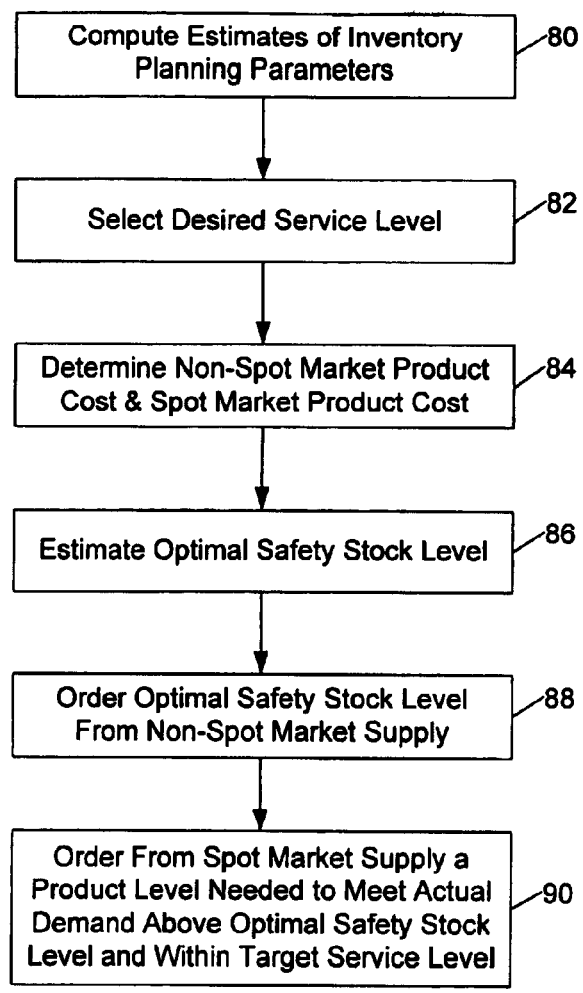
FIG. 9 is a flow diagram of an inventory planning process.

Referring to FIG. 9, in one embodiment, an asset manager may plan a safety stock level to cover uncertainty in demand over an exposure period with a desired service level based at least in part upon product availability from a spot market as follows. The asset manager first computes estimates of various inventory planning parameters, including an estimate of mean demand, an estimate of demand uncertainty, an estimate of mean lead time, and an estimate of lead time uncertainty (step 80). Various forecasting techniques may be used to project the future product demand parameters and the future delivery lead time parameters. For example, these parameters may be estimated based upon a variety of information, such as experience, customer information, non-spot market supplier information, and general economic conditions. Alternatively, these parameters may be forecasted based upon an analysis of historical shipment data using known statistical techniques. Next, the asset manager selects a desired service level (step 82). The selected service level generally reflects the business strategy of the enterprise. For example, an enterprise that wants a dominant market share may set relatively high service level requirements, whereas low-cost enterprises generally will set relatively low service level targets. The cost of carrying inventory and the cost of a lost sale also may be factored into the selection of the target service level. The asset manager then determines the cost of obtaining the product from non-spot market supplies and an estimate of the future cost of obtaining the product from the spot market (step 84). The spot market product cost should incorporate the per unit spot market cost as well as any spot market fees and other costs associated with obtaining products from the spot market. The spot market product cost may be the current spot market product cost, or it may be an estimate of a future spot market product cost that is based upon projected spot market and product demand conditions. An optimal safety stock level to keep on hand is estimated based on the inventory planning parameter data (step 86). The optimal safety stock level may be estimated using the above-described inventory planning engine. A stochastic analysis also may be performed (see, e.g., the process of FIG. 7) to enable the asset manager to make statistically significant decisions relating to one or more of the input parameters and, therefore, make better use of the supply available from the spot market. The asset manager orders the optimal safety stock level from non-spot market suppliers (step 88). The optimal safety stock level information also may be used by enterprise resource planning system 60 for resource planning purposes, or the information may be transmitted directly to the financial planning, purchasing and receiving functions of the enterprise. After the optimal safety stock level has been depleted, the asset manager will meet actual unmet demand with supplies purchased on the spot market. In particular, the asset manager will order from the spot market a product level needed to meet actual demand above the optimal safety stock level and within target service level requirements (step 90).

IV. Spot Market-Based Inventory Planning Services

Figure 10:
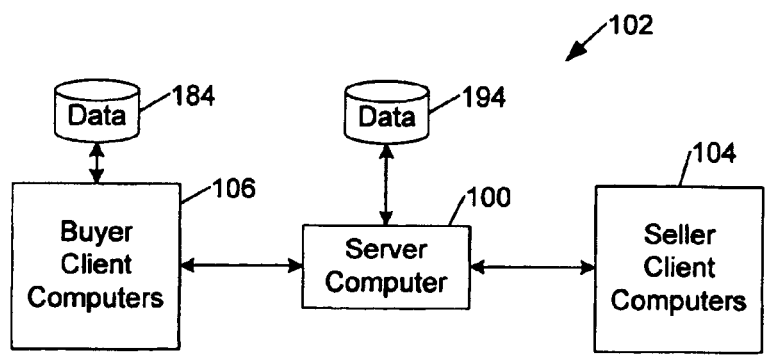
FIG. 10 is a block diagram of a computer network.

Referring to FIG. 10, inventory planning services may be provided by a server computer 100 over a network 102, which may be a local area network or a wide area network (e.g., the Internet). In particular, server computer 100 may be configured to establish a product spot market (or auction) Web site that enables one or more product suppliers 104 to attract numerous buyers 106 who, as a group, will determine a final price for the products being auctioned. In addition, server computer 100 may be configured to provide information that would enable buyers 106 to make better use of the spot market (e.g., information that would enable asset managers to plan inventory levels when supply is available from the spot market). The spot market established by server computer 100 may be structured to enable sellers 104 to select the products to be sold and the times at which the products will be offered for sale. Sellers 104 also may be permitted to specify a minimum price below which the product may not be sold; alternatively, sellers 104 may be permitted to reject the established market price for an item, unless the item is being sold without reserve.

In one embodiment, server 100 is accessible by buyers 106 and sellers 104 over the Internet. The Internet includes a vast number of computers and computer networks that are interconnected through communication links. The interconnected computers exchange information using various services (e.g., electronic mail, Gopher, and the World Wide Web ("WWW")). The WWW service allows server computer 100 (i.e., Web server or Web site) to send graphical Web pages of information to buyer client computers 106 and to seller client computers 106. The remote client computers may then display the Web pages. Each resource (e.g., computer or Web page) of the WWW is uniquely identifiable by a Uniform Resource Locator ("URL"). To view a specific Web page, a client computer specifies the URL for that Web page in a request (e.g., a HyperText Transfer Protocol ("HTTP") request). The request is forwarded to the Web server that supports that Web page. When that Web server receives the request, it sends that Web page to the client computer system. When the client computer receives that Web page, it typically displays the Web page using a browser, which is a special-purpose application program that requests and displays Web pages.

Web pages typically are defined using HyperText Markup Language ("HTML"). HTML provides a standard set of tags that define how a Web page is to be displayed. When a user indicates to the browser to display a Web page, the browser sends a request to the server computer system to transfer to the client computer system an HTML document that defines the Web page. When the requested HTML document is received by the client computer, the browser displays the Web page as defined by the HTML document. The HTML document contains various tags that control the displaying of text, graphics, controls, and other features. The HTML document may contain URLs of other Web pages available on that server computer system or other server computer systems.

Figure 11:
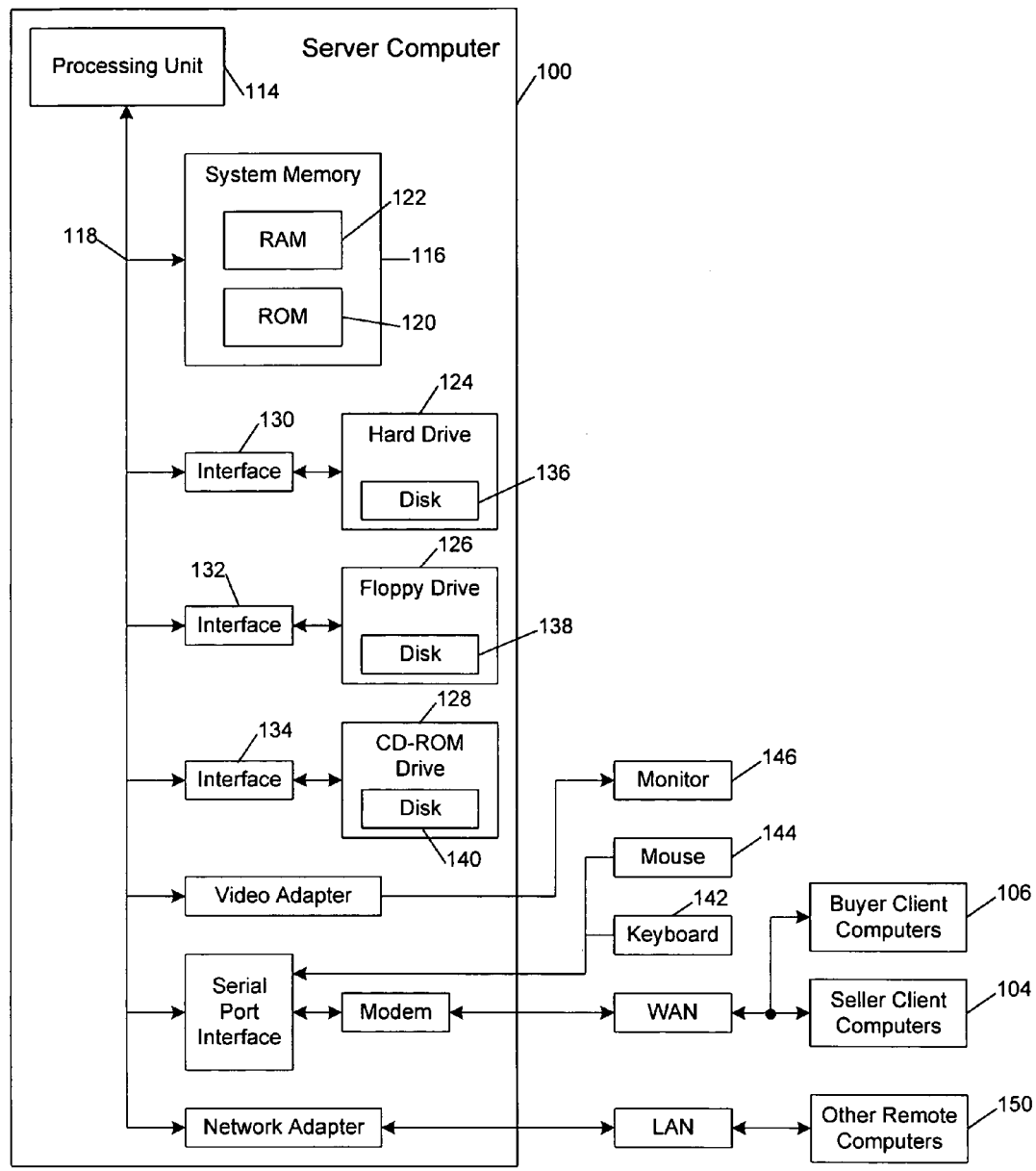
FIG. 11 is a block diagram of a server computer coupled to a plurality of remote computers.

Referring to FIG. 11, in one embodiment, server computer 100 includes a processing unit 114, a system memory 116, and a system bus 118 that couples processing unit 114 to the various components of server computer 100. Processing unit 114 may include one or more processors, each of which may be in the form of any one of various commercially available processors. System memory 116 includes a read only memory (ROM) 120 that stores a basic input/output system (BIOS) containing start-up routines for server computer 100, and a random access memory (RAM) 122. System bus 118 may be a memory bus, a peripheral bus or a local bus, and may be compatible with any of a variety of bus protocols, including PCI, VESA, Microchannel, ISA, and EISA.

Server computer 100 also includes a hard drive 124, a floppy drive 126, and CD ROM drive 128 that are connected to system bus 118 by respective interfaces 130, 132, 134. Hard drive 124, floppy drive 126 and CD ROM drive 128 contain respective computer-readable media disks 136, 138, 140 that provide non-volatile storage for data, data structures and computer-executable instructions (e.g., instructions implementing inventory planning engine 62). Other computer-readable storage devices (e.g., magnetic tape drives, flash memory devices, and digital video disks) also may be used with server computer 100. A user may interact (e.g., enter commands or data) with server computer 100 using a keyboard 142 and a mouse 144. Other input devices (e.g., a microphone, joystick, or touch pad) also may be provided. Information may be displayed to the user on a monitor 146. Server computer 100 also may include peripheral output devices, such as speakers and a printer.

Remote seller client computers 104, remote buyer client computers 106, and other remote computers 150, which are accessible over a local area network (LAN) 152, may be workstations, server computers, routers, peer devices or other common network nodes.

Figure 12:
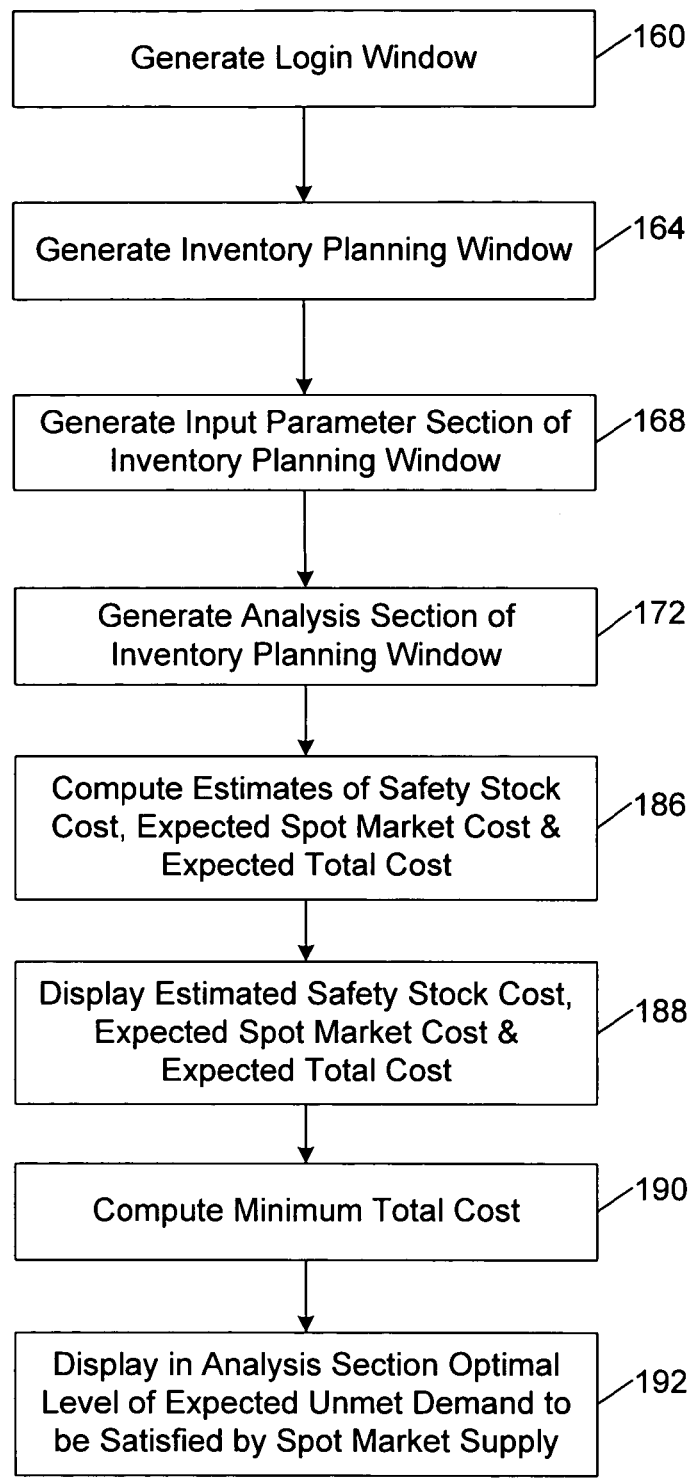
FIG. 12 is a flow diagram of a method of providing inventory planning services.
Figure 13:
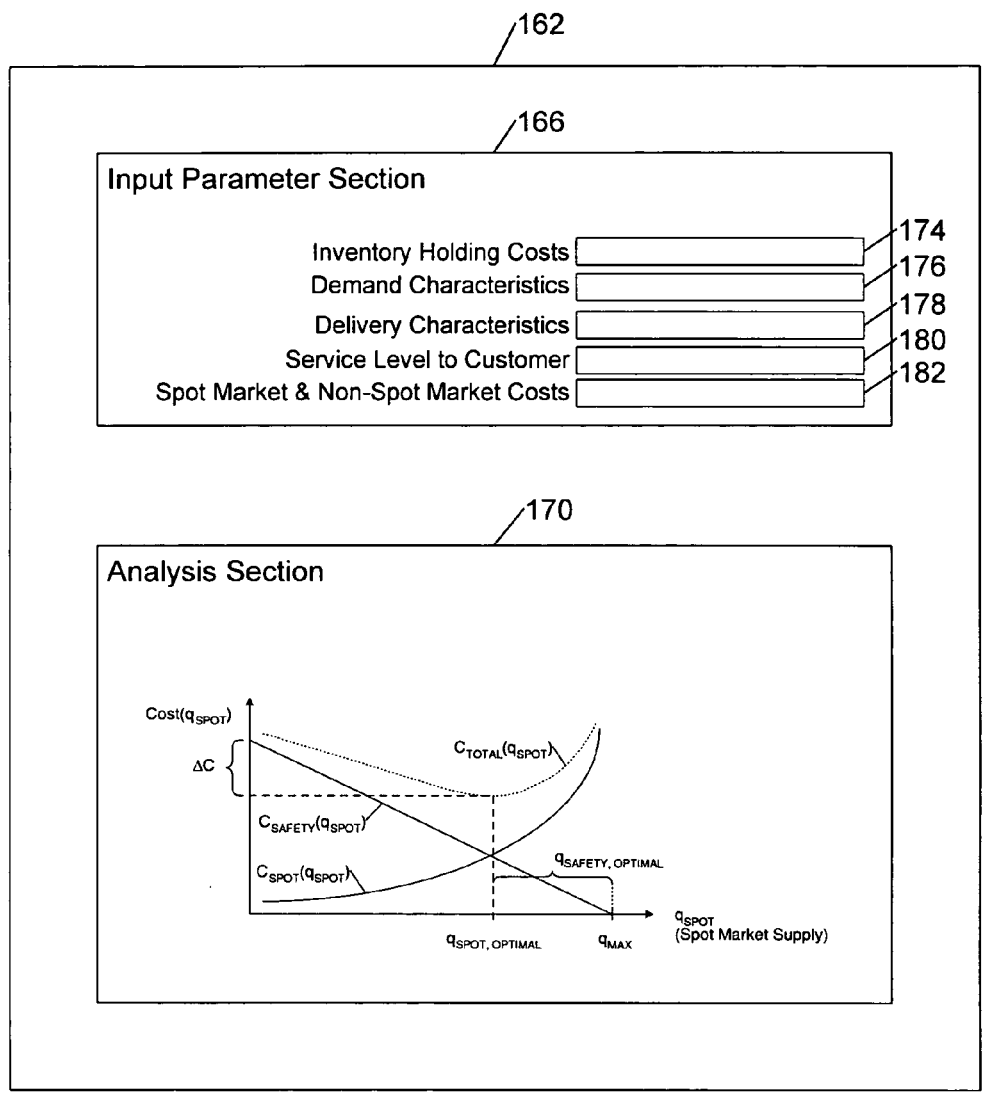
FIG. 13 is a diagrammatic view of a graphical user interface providing information relating to use of a spot market to plan an inventory level.

Referring to FIGS. 12 and 13, in one embodiment, server computer 100 may be configured to provide inventory planning services to buyers 106 as follows. When a buyer 106 initially accesses the spot market Web site established by server computer 100, server computer 100 generates a login window (or Web page) through which the buyer must pass before being allowed to navigate to other parts of the spot market Web site (step 160). The login window may prompt the buyer to enter a user name and a password if the buyer currently is registered with the spot market, or the login window may prompt the user to register with the spot market. After the buyer successfully enters the user name and password of a registered user, server 100 generates an inventory planning window 162 that will provide to the user information relating to use of the spot market to plan inventory levels (step 164). Within the inventory planning window (162), server computer generates an input parameter section 166 (step 168) and an analysis section 170 (step 172).

Input parameter section 166 prompts the buyer to enter data relating to inventory holding costs 174, product demand characteristics 176 (e.g., estimates of mean demand and demand uncertainty), product delivery characteristics 178 (e.g., estimates of mean lead time and lead time uncertainty), the target service level 180, and spot market costs 182 (e.g., per unit product cost and other spot market fees relating to obtaining products from the spot market). The buyer may enter estimates for each of the input parameters, or the buyer may upload historical data stored on a database 184 (see FIG. 10) from which server 100 may compute estimates for each of the input parameters. Server computer 100 preferably includes one or more computer application programs that are operable to implement known statistical techniques for computing estimates of each of the input parameters from historical data. In some embodiments, a communication link (e.g., a hyperlink to a remote computer address) may be provided enabling question-and-answer communication between a client computer and a remote computer. The remote computer may be networked with LAN 152 (FIG. 11), and may be configured to provide information relating to the estimation of one or more of the input parameters. The information may be provided passively (e.g., textual descriptions of one or more statistical approaches that may be used to compute one or more of the input parameters), or dynamically (e.g.; a macro or Wizard based routine that guides users through the computation process). Alternatively, a user may communicate with a customer service expert qualified to answer questions relating to use of the system or relating to the estimation of the input parameters. The user may communicate with the customer service expert by e-mail or over the phone.

After estimates for each of the input parameters have been obtained, server computer 100 uses inventory planning engine 62 to compute estimates of the expected safety stock cost, the expected spot market cost, and total expected cost as a function of expected unmet demand within the target service level requirements to be satisfied by products obtained from the spot market (step 186). Server computer 100 graphically displays the computed cost estimates in analysis section 170 (step 188). In addition, server computer 100 computes the minimum total cost (step 190), and displays in analysis section 170 the optimal level of expected unmet demand to be satisfied by the spot market ($q_{SPOT,\ OPTIMAL}$) (step 192). Server 100 preferably also displays the optimal level of safety stock ($q_{SAFETY,\ OPTIMAL}$) to be kept on hand to minimize the total expected cost.

Referring back to FIG. 10, server computer 100 also may be configured to store various kinds of information in a database 194. For example, in addition to storing information relating to registered buyers and sellers, server 100 may store historical price data for products auctioned on the spot market. This historical price information may be analyzed statistically, and the analyzed spot market historical price statistics may be provided to buyers 106 to assist them in their inventory planning decision-making.

Other embodiments are within the scope of the claims.

The systems and methods described herein are not limited to any particular hardware or software configuration, but rather they may be implemented in any computing or processing environment. The inventory planning engine preferably is implemented in a high level procedural or object oriented programming language; however, the program may be implemented in assembly or machine language, if desired. In any case, the programming language may be a compiled or interpreted language.

In one embodiment, the inventory planning engine described above was implemented as a Visual Basic® for Applications (VBA) computer program operable as a spreadsheet tool in the Microsoft® Excel application program. The following VBA code computes equations (1)-(4) and (6) above; the remaining computations, including the cost minimization process, may be performed within a Microsoft® Excel spreadsheet using standard cell functions.

```
' Definition of input arguments
' demandMean:              Mean weekly demand (units/week)
' demandSD:                Standard deviation of weekly forecast
                           error (units/week)
' replenishmentTimeMean:   Mean replenishment time--order to
                           receipt (weeks)
' replenishmentTimeSD:     Standard deviation of replenishment
                           time (weeks)
' reviewPeriod:            Review period--for reviewing inventory
                           status (weeks)
' deliveryFrequency:       Replenishment frequency (receipts/
                           week)
' * availabilityRate:      Customer service level--fill rate
                           (fraction)
' * inventoryOnhandWeeks:  Average on-hand inventory (weeks of
                           supply)
' promisedDeliveryTime:    Promised delivery time--SRT--less
                           production time (weeks)
' Definition of output parameters
' inventorySafetyUnits:    Safety stock (units)
' inventoryOnhandUnits:    Average on-hand inventory (units)
' * inventoryOnhandWeeks:  Average on-hand inventory (weeks of
                           supply)
' * availabilityRate:      Customer service level or fill rate
                           (fraction)
' delayTime Weeks:         Mean delay time when a stockout
                           occurs (weeks)
' inventoryPositionUnits:  Target stock level, order-up-to point
                           (units)
' Calculates INVENTORY levels, based on customer service,
using the BTO model
Function calcInventoryBTO(demandMean As Double, _
         DemandSD As Double, _
         replenishmentTimeMean As Double, _
         replenishmentTimeSD As Double, _
         ReviewPeriod As Double, _
         deliveryFrequency As Double, _
         availabilityRate As Double, _
         promisedDeliveryTime As Double)
Dim inventoryResultsBTO(5) As Double
Dim inventorySafetyUnits As Double
Dim inventoryOnhandUnits As Double
Dim inventoryOnhandWeeks As Double
Dim delayTimeAverage As Double
Dim inventoryPositionUnits As Double
Dim inventoryCycleUnits As Double
Dim demandReplMean As Double
Dim demandReplSD As Double
' Calculate cycle stock (units)
inventoryCycleUnits = demandMean/(deliveryFrequency * 2)
inventorySafetyUnits = SafetyStock(demandMean, _
         DemandSD, _
         replenishmentTimeMean, _
         replenishmentTimeSD, _
         ReviewPeriod, _
         (1 - availabilityRate), _
         promisedDeliveryTime)
' Calculate average on-hand inventory (units)
inventoryOnhandUnits = inventorySafetyUnits + inventoryCycleUnits
' Calculate average on-hand inventory (weeks)
inventoryOnhandWeeks = inventoryOnhandUnits/demandMean
' Calculate the mean delay time
delayTimeAverage = delayWeeksMean (demandMean, _
         DemandSD, _
         replenishmentTimeMean, _
         replenishmentTimeSD, _
         ReviewPeriod, _
         inventorySafetyUnits)
' Calculate the inventory position (units)
inventoryPositionUnits = inventorySafetyUnits + demandReplMean
' Gather the results together in an array
    inventoryResultsBTO(1) = inventorySafetyUnits
    inventoryResultsBTO(2) = inventoryOnhandUnits
    inventoryResultsBTO(3) = inventoryOnhandWeeks
    inventoryResultsBTO(4) = delayTimeAverage
    inventoryResultsBTO(5) = inventoryPositionUnits
' Return the array of results
    calcInventoryBTO = inventoryResultsBTO
End Function
```

```
' Calculates stockout rate at a point in time
Function delayWeeksMean(demandMean As Double, _
                DemandSD As Double, _
                replenishmentTimeMean As Double, _
                replenishmentTimeSD As Double, _
                ReviewPeriod As Double, _
                inventorySafetyUnits As Double)
Dim incStockout As Double
Dim sumStockout As Double
Dim tempTime As Double
Dim numPeriods As Long
Dim timePeriod As Long
' Calculate the maximum number of iterations
numPeriods = Int(demandReplVar(demandMean, _
                DemandSD, _
                replenishmentTimeMean, _
                replenishmentTimeSD, _
                ReviewPeriod, _
                0)/DemandSD^2)
' Initialize the loop variables
timePeriod = 0
sumStockout = 0
' Loop over the time periods calculating the probability of a stockout;
' Stop when incremental change is too small to worry about
Do
    tempTime = timePeriod
    incStockout = stockoutRate(demandMean, _
                DemandSD, _
                replenishmentTimeMean, _
                replenishmentTimeSD, _
                ReviewPeriod, _
                inventorySafetyUnits, _
                tempTime)
    sumStockout = sumStockout + incStockout
    timePeriod = timePeriod + 1
Loop While (timePeriod < numPeriods And_
        incStockout >= (0.001 * sumStockout))
' Calculate mean delay time
delayWeeksMean = (sumStockout/stockoutRate(demandMean, _
                DemandSD, _
                replenishmentTimeMean, _
                replenishmentTimeSD, _
                ReviewPeriod, _
                inventorySafetyUnits, _
                0) - 0.5) * ReviewPeriod
End Function
' Calculates units of safety stock commensurate with a
' probability of stocking out at a point in time
Function SafetyStock(demandMean As Double, _
                DemandSD As Double, _
                replenishmentTimeMean As Double, _
                replenishmentTimeSD As Double, _
                ReviewPeriod As Double, _
                stockoutRate As Double, _
                timeShift As Double)
Dim demandReplSD As Double
Dim safetyStockFactor As Double
' Calculate SD of replenishment (pipeline) demand
demandReplSD = Sqr(demandReplVar(demandMean, _
                DemandSD, _
                replenishmentTimeMean, _
                replenishmentTimeSD, _
                ReviewPeriod, _
                timeShift))
' Calculate safety stock factor
safetyStockFactor = -Application.NormSInv(stockoutRate)
' Calculate safety stock (units)
SafetyStock = (safetyStockFactor * demandReplSD) - (demandMean *
timeShift)
End Function
' Calculates probability of a stockout at a point in time
Function stockoutRate(demandMean As Double, _
                DemandSD As Double, _
                replenishmentTimeMean As Double, _
                replenishmentTimeSD As Double, _
                ReviewPeriod As Double, _
                inventorySafetyUnits As Double, _
                timeShift As Double)
Dim demandReplSD As Double
Dim safetyStockFactor As Double
' Calculate SD of replenishment (pipeline) demand
demandReplSD = Sqr(demandReplVar(demandMean, _
                DemandSD, _
                replenishmentTimeMean, _
                replenishmentTimeSD, _
                ReviewPeriod, _
                time Shift))
' Calculate safety stock factor
safetyStockFactor = (inventorySafetyUnits + (demandMean *
timeShift))/
                demandReplSD
' Calculate stockout rate (fraction)
stockoutRate = Application.NormSDist(-safetyStockFactor)
End Function
' Calculates uncertainty of replenishment (pipeline)
demand (as a variance)
Function demandReplVar(demandMean As Double, _
                DemandSD As Double, _
                replenishmentTimeMean As Double, _
                replenishmentTimeSD As Double, _
                ReviewPeriod As Double, _
                timeShift As Double)
Dim adjReplTime As Double
' Adjust the replenishment time, but keep the result positive
adjReplTime = replenishmentTimeMean + ReviewPeriod - timeShift
If (adjReplTime < 0) Then
    adjReplTime = 0
End If
' Calculate the variance of replenishment (pipeline) demand
demandReplVar   = (demandMean^2 * replenishmentTimeSD^2) +
                (DemandSD^2 * adjReplTime)
End Function
' Calculate the expected Auction Cost
Function ExpAuCost(SafetyStock As Single, _
                AuctionVolume As Single, _
                MeanDemand As Single, _
                DemandCoV, _
                MeanLeadTime As Single, _
                LeadTimeCoV As Single, _
                ReviewPeriod As Single, _
                AuctionCost As Single, _
                TraditionalCost As Single)
Dim x As Integer
Dim prb As Single
Dim ReducedSS As Single
Dim E As Single
Dim LeadTimeSD As Single
Dim DemandSD As Single
Dim PriceDelta As Single
Dim ExposureMean As Single
Dim ExposureSD As Single
Const WeeksInYear = 52
ReducedSS = SafetyStock - AuctionVolume
' Demand and Lead Time Standard Deviation
DemandSD = MeanDemand * DemandCoV
LeadTimeSD = MeanLeadTime * LeadTimeCoV
' Calculation of the mean and standard deviation of demand over the
exposure period
Exposure    = MeanDemand * (MeanLeadTime + ReviewPeriod)
Mean
ExposureSD  = Sqr(MeanDemand^2 *
                LeadTimeSD^2 + (MeanLeadTime
                + ReviewPeriod) * DemandSD^2)
' Difference in product price between auction and traditional channel
PriceDelta = AuctionCost - TraditionalCost
' Numerical calculation of the expected value by which the demand in the
' exposure period will exceed the Reduced Safety Stock
(up to the full Safety Stock);
' this is the expected amount that must be purchased from the auction
For x   = ReducedSS + 1 To SafetyStock
    prb = Application.NormDist(ExposureMean + x, ExposureMean,
        ExposureSD, 1) - Application.NormDist(ExposureMean + x - 1,
        ExposureMean, ExposureSD, 1)
```

```
ExpAuCost = ExpAuCost + prb * (x - ReducedSS) * PriceDelta
Next x
' annualize the result
ExpAuCost = ExpAuCost * (WeeksInYear/ReviewPeriod)
End Function
```

Still other embodiments are within the scope of the claims.

What is claimed is:

1. A machine-implemented inventory planning method, comprising computing and generating an optimal safety stock level record for a product to cover uncertainty in demand over an exposure period with a desired service level, wherein the computing comprises executing a safety stock calculation process that directly calculates the optimal safety stock level record from a set of input parameter values including a value of a cost of obtaining the product from one or more spot market sources.

2. The method of claim 1, wherein the computing comprises:
determining a maximum safety stock level of the product to cover the uncertainty in demand over the exposure period with the desired service level with the product being supplied solely from one or more non-spot-market sources.

3. The method of claim 2, wherein the determining comprises determining the maximum safety stock level based in part upon a measure of lead time for obtaining the product from the one or more non-spot-market sources.

4. The method of claim 3, wherein the determining comprises determining the maximum safety stock level based in part upon a measure of lead time uncertainty associated with the obtaining of the product from the one or more non-spot-market sources.

5. The method of claim 4, wherein the determining comprises determining the maximum safety stock level based in part upon a measure of demand for the product.

6. The method of claim 5, wherein the determining comprises determining the maximum safety stock level based in part upon a measure of demand uncertainty for the product.

7. The method of claim 2, wherein the computing comprises reducing the maximum safety stock level based on a total cost of covering the maximum safety stock level with a first amount of the product supplied from the one or more spot market sources and a second amount of the product supplied from the one or more non-spot-market sources.

8. The method of claim 7, wherein the computing comprises reducing the maximum safety stock level to a value that minimizes the total cost.

9. The method of claim 1, wherein the computing comprises performing a stochastic simulation of one or more random variables.

10. The method of claim 1, further comprising ordering the optimal safety stock level from the one or more non-spot-market sources.

11. The method of claim 10, further comprising ordering from the one or more spot market sources a product level needed to meet actual demand for the product above the optimal safety stock level and within the desired service level.

12. The method of claim 11, wherein the ordering from the one or more spot market sources comprises navigating a web site providing information relating to the one or more spot market sources.

13. The method of claim 1, wherein the computing comprises navigating a web site providing information relating to the one or more spot market sources.

14. The method of claim 13, wherein the computing comprises transmitting from the web site information relating to demand for the product and information relating to lead time for obtaining the product from one or more non-spot-market sources.

15. The method of claim 1, further comprising performing enterprise resource planning based upon the computed optimal safety stock level.

16. The method of claim 1, wherein the computing comprises minimizing a total cost of covering the uncertainty in demand over the exposure period with the desired service level with a first amount of the product supplied by the one or more spot market sources and a second amount of the product supplied by one or more non-spot-market sources.

17. A machine-implemented inventory planning method, comprising computing and generating an optimal safety stock level record for a product to cover uncertainty in demand over an exposure period with a desired service level based at least in part on a cost of obtaining the product from one or more spot market sources, wherein the computing comprises
determining a maximum safety stock level of the product to cover the uncertainty in demand over the exposure period with the desired service level with the product being supplied solely from one or more non-spot-market sources,
reducing the maximum safety stock level based on a total cost of covering the maximum safety stock level with a first amount of the product supplied from the one or more spot market sources and a second amount of the product supplied from the one or more non-spot-market sources, and
iteratively reducing the second amount of the product from an initial amount equal to the maximum safety stock level and determining the total cost.

18. The method of claim 17, wherein the computing comprises repeating the reducing of the second amount of the product and the determining of the total cost until the total cost is minimized.

* * * * *